United States Patent [19]

Takano et al.

[11] 4,260,351
[45] Apr. 7, 1981

[54] APPARATUS FOR PRODUCING FOAMED PLASTIC INSULATED WIRES

[75] Inventors: Hideo Takano; Yukio Shimohori; Shigeho Fukuda, all of Hitachi, Japan

[73] Assignee: Hitachi Cables, Ltd., Tokyo, Japan

[21] Appl. No.: 38,148

[22] Filed: May 11, 1979

Related U.S. Application Data

[60] Division of Ser. No. 892,549, Apr. 3, 1978, Pat. No. 4,182,734, which is a continuation of Ser. No. 628,626, Nov. 4, 1975, abandoned.

[51] Int. Cl.³ .......................... B29D 27/00; B29F 3/10
[52] U.S. Cl. ........................................ 425/113; 264/37; 264/40.5; 264/45.9; 264/50; 425/145; 425/149; 425/467
[58] Field of Search ....................... 264/45.9, 46.1, 37, 264/40.5; 425/149, 145, 467, 113

[56] References Cited

U.S. PATENT DOCUMENTS

| 2,246,149 | 6/1941 | Troche et al. | 264/40.5 X |
| 2,766,481 | 10/1956 | Henning | 264/45.9 |
| 3,278,988 | 10/1966 | Hannis | 264/40.5 X |
| 3,300,554 | 1/1967 | Bachus | 264/45.9 |
| 3,353,209 | 11/1967 | Schad | 425/149 X |
| 3,704,972 | 12/1972 | Kneller et al. | 425/145 |
| 3,845,184 | 10/1974 | Nackaerts | 425/467 X |
| 3,936,519 | 2/1976 | Crystal | 264/45.9 X |
| 3,947,172 | 3/1976 | Myers | 425/467 X |

FOREIGN PATENT DOCUMENTS

| 42-24061 | 11/1967 | Japan | 264/37 |
| 1434775 | 5/1976 | United Kingdom | 264/45.9 |

Primary Examiner—Philip Anderson
Attorney, Agent, or Firm—Sughrue, Rothwell, Mion, Zinn and Macpeak

[57] ABSTRACT

An apparatus for producing a foamed plastic insulating coating in a wire. A gaseous foaming agent is mixed with a resin and passed through a high pressure narrow passage and then through a lower pressure wide passage.

The release of pressure, when the resin enters the wide passage, results in a foaming of the resin. The foamed resin is thereafter extruded through an orifice onto a wire. In one embodiment a chemical is added to serve as a nuclei for the gas bubbles formed during foaming. In a second embodiment, a second chemical is added to provide a smoother extruded surface. In still a further embodiment, the pressure in the wide passage is automatically controlled to remain at a predetermined preferred pressure.

4 Claims, 9 Drawing Figures

APPARATUS FOR PRODUCING FOAMED PLASTIC INSULATED WIRES

This is a division of application Ser. No. 892,549, filed Apr. 3, 1978, now U.S. Pat. No. 4,182,734, which is a continuation of Ser. No. 628,626, filed Nov. 4, 1975, now abandoned.

BACKGROUND OF THE INVENTION

This invention relates to an apparatus for producing electric wires (for example, such as insulated cores for communication cables, or high frequency coaxial wires) having an insulating layer of plastic on the periphery of conductor.

The methods of producing foamed plastic insulated wires of the kind heretofore mentioned are divided into two main classes as follows:

1. Chemical foaming method

In this method, a chemical foaming agent and a foaming nucleus are blended into the plastic, and the chemical foaming agent is decomposed during extrusion by heat generated to thereby form gases. This method is very effective and has obtained excellent results to foam low density polyethylenes. The abovementioned method, however, possesses several problems in that it is difficult to form minute bubbles within polypropylene and high density polyethylene. Generally, polypropylene and high density polyethylene require a temperature in the range of from 240° to 280° C. or more when they are extruded. At present, however, it is difficult to find a chemical foaming agent wherein decomposition takes place at such temperatures to thereby form gases.

2. Gas foaming method

The chemical foaming method employs a process wherein the gases are formed in molten plastic by way of thermal decomposition of the foaming agent, whereas the gas foaming method employs a process wherein the gases are directly pressurized and diffused into molten plastic for the purpose of foaming. A simplified process of gas foaming is shown in FIG. 1. As is evident from FIG. 1, when gas is pressurized and directed into molten plastic, a certain amount of the gas is dissolved or diffused in the form of particles into the plastic depending upon temperature, pressure and time. Thereafter, when the gas pressure is released rapidly, the diffused gas particles within the material are oversaturated to form bubbles. At the same time, the plastic is subjected to adiabatic expansion so that the material lowers in temperature and increases in viscosity to prevent the excessive growth of bubbles.

This method may normally be put in practice by using an extruding machine as shown in FIG. 2.

In accordance with the method shown, plastic P and gaseous foaming agent G are fed into a cylinder CY in the extruding machine, the gaseous foaming agent and the plastic are completely blended by means of a screw SC within the cylinder CY to form a uniform molten body, which is then fed under pressure into a die of a cross head H in the extruding machine. When the pressure is released from the die, a foamed insulated layer is coated on the periphery of a wire W travelling in a direction as indicated by the arrow adjacent the cross head. In this case, the pressure within the cylinder of the extruding machine and the pressure within the cross head must be maintained at a high enough pressure to prevent gases in the molten plastic from forming bubbles. Bubble nuclei are formed by release of pressure from the extruding die thereby forming bubbles in the extruded molten plastic, and forming a foamed plastic coating on the wire W.

However, even in the gas foaming method using the extruding machine as described above, there are several difficulties, as noted below, that must be overcome.

(1) Due to unstable extruding pressure, a uniform foamed construction cannot be obtained.

(2) Pour-gas (input gas) is high in pressure, and the diameter of bubbles and the degree of foamation are difficult to control.

(3) In the case where high density polyethylene is the plastic material, the softening temperature (extrusion temperature) is higher than the decomposition temperature of a foaming agent, with the result that a foamed construction is hard to obtain.

(4) It is difficult to maintain the extrusion pressure constant during the entire process. This is particularly a problem during the start of the extrusion operation and the termination of the extrusion operation. As a consequence, a uniform foamed construction cannot be obtained.

It is therefore an object of the present invention to provide a novel and useful apparatus for producing foamed plastic insulated wires while overcoming various problems noted above.

SUMMARY OF THE INVENTION

According to a first method of the present invention there is provided a foaming method wherein gas is directly admitted under pressure, the method comprising the steps of: passing a resin, which contains therein a gaseous foaming agent, through a narrow passage, said resin being passed through a screw part (a cylinder part); and thereafter extruding said resin through a wide passage in communication with an extrusion orifice.

According to a second method of the present invention, there is provided a method of producing foamed plastic insulated wires wherein the resin, which contains a gaseous foaming agent and which passes through a screw part to a cross head, has added thereto a thermally and chemically stabilized organic compound which serves as a nucleus to form a foamed construction having minute bubbles. Furthermore, according to a third embodiment, a small amount of an ethylene-propylene copolymer is added to increase the smoothness of the extruded foamed insulating coating. According to a fourth embodiment the pressure in the foaming region of the apparatus is maintained at a prefixed level by means of a pressure sensing mechanism, a pressure release value, and a control system connected therebetween.

DETAILED DESCRIPTION OF THE DRAWINGS

Figure 3:
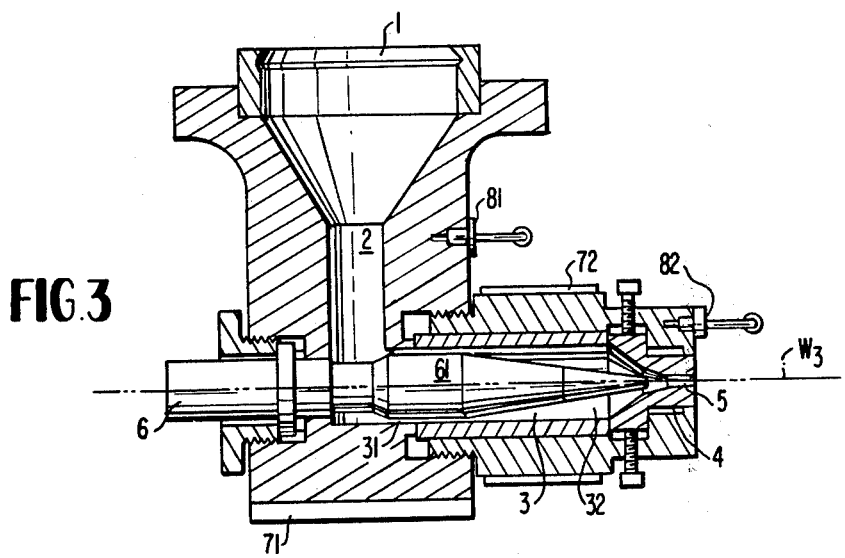
FIG. 3 is a sectional view showing one embodiment of a principal portion of the extruding machine suitable for carrying out a first method according to the present invention.

FIG. 3 shows a cross head part which forms a principal portion of an extruding machine suited to obtain a linear foamed body with a wire encased therein.

This cross head comprises a passage 2 fed from a breaker plate 1 and a passage 3 crossed with the passage 2 and provided with a die 4, at the nose of which is formed an extrusion orifice 5. A nose exchangeable hollow nipple 6 is inserted in the passage 3 and the nose thereof reaches close to the extrusion orifice 5. The cross head described thus far is of a conventional type which obtains a plastic linear body encasing therein a wire. However, in order to carry out the present invention, a specifically designed nipple 6 is employed in this particular example.

That is, the nipple herein used is designed so that a portion corresponding to an inlet of the passage 3 has an outside diameter approximate to the inside diameter of the passage 3 over a fixed length so as to form a narrow passage 31 and a wide passage 32 in the passage 3, and a portion continuous to the aforesaid outside diameter is formed into a convergent configuration, whereby pressure within the wide passage 32 is always maintained smaller than pressure within the passage 2. In FIG. 3, the reference numerals 71 and 72 denote heaters, and 81 and 82 denote thermocouples.

Figure 1:
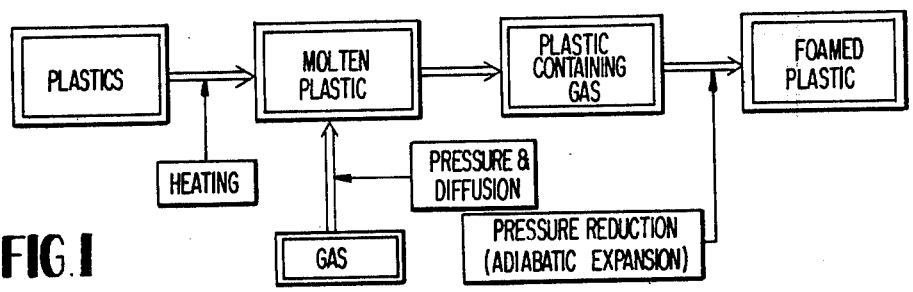
FIG. 1 is a block diagram showing a prior art process for forming gas foamed plastic.
Figure 2:
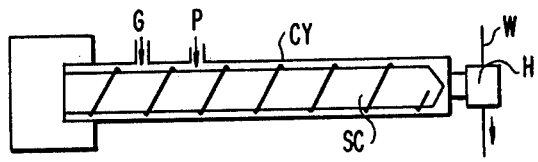
FIG. 2 illustrates prior art apparatus for use in a gas foaming method.

In the extruding machine provided with a cross head designed as described above, molten plastic with a gaseous foaming agent admitted under pressure and impregnated in a screw part such as shown in FIG. 2 is fed into the passage 3 through the passage 2 and is extruded and coated on a wire $W_3$ which passes through the extrusion orifice 5 via the nipple 6 in the die 4 to form a desired foamed body. Molten plastic which enters the passage 3 is compressed by the narrow ring-like passage 31 formed in the periphery of a large diameter portion 61, after which the plastic is forced into the continuous wide passage 32. Therefore, the gaseous foaming agent contained in the molten plastic is separated from the molten plastic due to the difference of pressure therebetween to produce bubbles in the molten plastic. The molten plastic thus formed into a foamed body is subsequently compressed by the die 4, after which it is released and extruded in the form of a foamed body having uniform and minute bubbles. In this case, the passage 2 is in communication with the passage 32 through the narrow passage 31 so that an internal pressure thereof is restricted on the narrow passage 31 to minimize possible fluctuation, thus providing an extremely stable condition.

Figure 4:
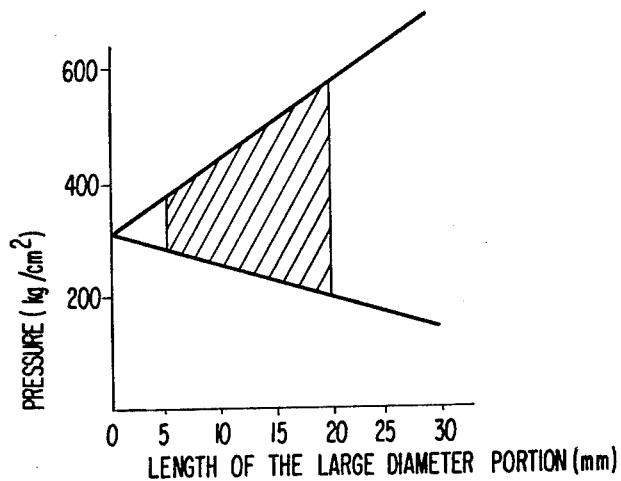
FIG. 4 shows the relationship between the pressure and the length of a large diameter portion of the apparatus of FIG. 3.

Experiments conducted by the present inventors have proved that to obtain a foamed body of an outside diameter between 0.3 to 1.2 mm encasing therein a wire in accordance with the method previously described, a good quality foamed body may be obtained by setting the pressure within the passage and the length of the large diameter portion 61 in the relationship within the range indicated by the cross hatched area as shown in FIG. 4.

It has also been found necessary to have the following relationship with respect to dimensions of various parts in order to obtain a pressure distribution as desired.

$$1.02 \leq \frac{D}{D_o} \leq 1.08 \text{ (preferably, } \frac{D}{D_o} = 1.04\text{)} \quad (a)$$

$$5 \leq \frac{2R}{D - D_o} \leq 20 \text{ (preferably, } \frac{2R}{D - D_o} = 10\text{)} \quad (b)$$

where,
D: inside diameter (mm) of passage 3
$D_o$: outside diameter (mm) of large diameter portion 61
R: Length (mm) of large diameter portion 61

If the resistance in the large diameter portion 61 is excessively high, the apparatus may be destroyed, whereas if the resistance is excessively low, the pressure distribution as seen in FIG. 4 cannot be obtained.

It has further been found that if the above relationship is maintained, the influence upon the wire due to extrusion pressure (particularly, reduction in dimension, and lowering in elongation) will be substantially reduced. Also adherence to the wire may be improved to the same extent as where the wire is coated with non-foamed plastic. It seems that the relief of influence of the extrusion pressure on the wire is attributed to the fact that the high pressure in the passage 2 is relieved by the provision of the narrow passage 31 and the wide passage 32 and is not carried over to the wide passage 32. Further, it seems that the improvement in adherence is attributed to the fact that foaming takes place prior to extrusion rather than substantially simultaneously. This is true in view of the fact that the diameter of a bubble within the foamed body obtained is less than 10 microns while the diameter thereof according to the prior art method is from 20 to 30 microns. As a consequence, it has been found that the elongation characteristic of the foamed body itself is materially improved in the range of from 250 to 400% while the elongation characteristic according to prior art is less than 100%.

As is evident from the discussion of the above mentioned embodiment, the first method according to the present invention enables one to stabilize the extrusion pressure and to produce foamed bodies having a good elongation characteristic and a high density of bubbles by imparting a great pressure variation to the plastic containing a foamed agent passed through the screw part before it reaches the extrusion orifice, and in addition, even in the case with the wire encased, the wire is not adversely affected and the adherence can be improved, thus greatly enhancing the practical value of the invention.

According to a second method, an organic compound is added to the resin to serve as a nucleus of the foamed construction. The resin is otherwise extruded in the same manner as shown in FIG. 3.

One organic compound suitable for the second method is phthalic hydrazide (2,3-dihydro-1,4-phthalazinedione), which is represented by the chemical structural formula as follows:

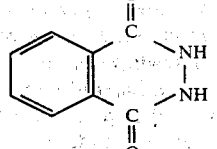

This organic compound is a stabilized compound which will not melt at a temperature below 320° C., undergoes no decomposition, exothermic, and endothermic, and has no re-arrangement of molecular structure, and does not injure plastic.

The organic compound is mixed into the plastic beforehand, after which the plastic is melted and blended with the chemical by the extruding machine. The organic compound itself is not melted but the crystals thereof are present in the molten plastic. Subsequently, gases are admitted under pressure into the molten plastic and are sufficiently dissolved into the molten plastic, as previously described. When molten plastic in that condition is foamed by release of pressure in the cross head, nuclei are formed about the organic compound thereby forming minute bubbles in the molten plastic.

Figure 5:
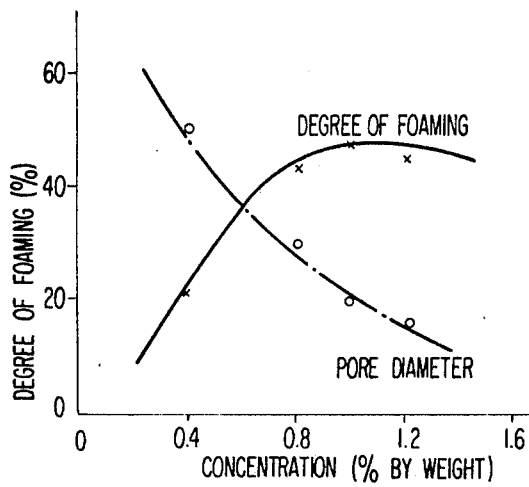
FIG. 5 is a diagram showing the influence on density and foaming of an organic compound in a second method according to the present invention.

FIG. 5 is a graphical representation showing the relationship between the density and the foaming of phthalic hydrazide. The degree of foaming or the diameter of the bubbles may freely be controlled by variation of a quantity of mix to plastic.

The organic compound suitable for the present invention has its specific heat (20° C.) 0.2–0.4 cal/g °C. (in the vicinity of extrusion temperature 200° C., 0.25–0.45 cal/g °C., preferably 0.28–0.35 cal/g °C.) and thermal conductivity (20° C.) $0.9–1.8 \times 10^{-4}$ cal/cm sec. °C. (in the vicinity of extrusion temperature 200° C., $1.1–2.0 \times 10^{-4}$ cal/cm sec. °C., preferably $1.15–1.25 \times 10^{-4}$ cal/cm sec. °C.). The organic compound must be a compound which is not melted at a temperature below 320° C. and which undergoes no decomposition, exothermic, and endothermic. The use of such an organic compound enables one to obtain sufficiently minute foamed bodies at a pressure, in which a gaseous foaming agent, for example, such as nitrogen gas, is directly admitted under pressure into molten plastic, of 5–30 kg/cm², preferably 14–22 kg/cm² (FIG. 5 is based on gas pressure of 18 kg/cm²). The compound used in the second method may be used in the third method also.

It will be noted that the smaller the average diameter of particles of the organic compound, the finer will be the bubble construction obtained. It has been found that the average diameter of the particles in a range from 0.6 to 10 microns is preferable and that it is also preferable to use an organic compound having a density in the vicinity of 1.1–1.4 g/cm³ at 20° C., preferably 1.2–1.3 g/cm³ at 20° C. According to the second method of the present invention, as is evident from the foregoing embodiment, the degree of foaming and the average diameter of bubbles may be controlled. Such control has been difficult in conventional physical foaming methods. Also foaming may be obtained at a gas pressure relatively lower than in prior arts to thereby improve the foaming efficiency.

According to a third method of the present invention, which is particularly useful when a foamed substance composed of a high density polyethylene (of which density is in excess of 0.945) is coated on the periphery of a metallic wire strip, the method defined in the first method has added thereto, 0.2–2.0 parts of an organic compound having a thermal conductivity of $1.0–2.0 \times 10^{-4}$ cal/cm. sec. °C. (at a temperature of 200° C.) and which will not undergo chemical changes such as decomposition, exothermic change, and endothermic change at a temperature less than 300° C., into 100 parts of said high density polyethylene; blending therein 2–8 parts of ethylene-propylene copolymer of melt flow index 3.0–4.0; heating and mixing the same; adding a gaseous foaming agent under pressure, and extruding it onto a low pressure zone to form a foamed high density polyethylene insulated coating.

Gas foaming was carried out on the periphery of a wire, having an outside diameter of 0.4 to 0.5 mm, using only high density polyethylene and a nucleus foaming agent without blending ethylene-propylene copolymer, thereby forming a foamed body which has an outside diameter of from 0.8 to 1.2 mm. The degree of foaming was from 20 to 30% at a speed of 800 m/min., and the (average) surface roughness of the foamed body was from 2.8 to 3.4 microns.

The same experiment was repeated except that five parts weight of ethylene-propylene copolymer (melt flow index 3.1) per 100 parts resin were mixed according to the third method described above. The average roughness of the surface at a speed of 1500 m/min. was from 0.6 to 0.9 microns.

Figure 6:
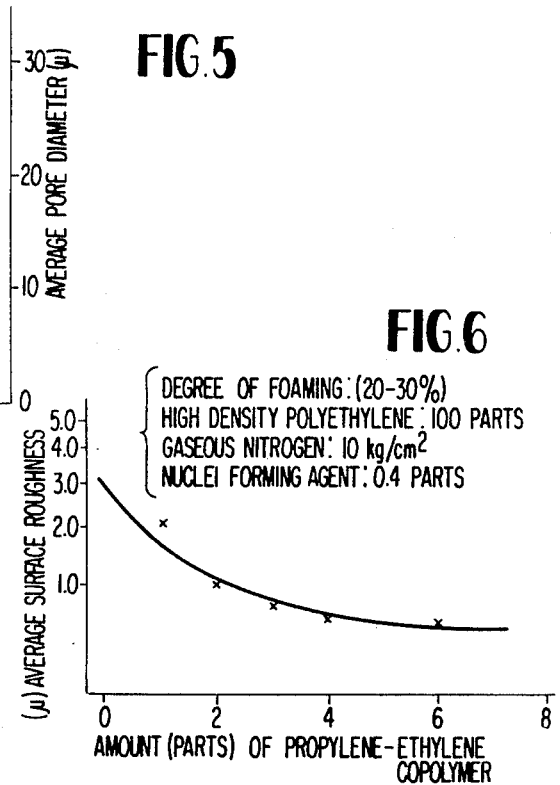
FIG. 6 is a diagram showing experimental results in a third method according to the present invention (the average surface roughness is indicated by logarithmic graduations)

The results obtained by experiments are shown in FIG. 6.

As is clearly seen from FIG. 6, if the added amount of ethylene-propylene copolymer is less than 2 parts per hundred parts of plastic, the surface roughness is not effectively improved. Also if the former is blended more than 8 parts per 100, the surface roughness is not further improved. Further, if the amount of a nucleus forming agent (organic compound) blended with the plastic is less than 0.2 parts, the degree of foaming is decreased, and if the former is blended at more than 2 parts, the degree of foaming will not be effectively increased. As is evident from the foregoing embodiment, the third method according to the present invention has advantages as follows:

1. Particularly in the case of foamed-polyethylene extruding a small diameter electric wire less than 0.4–0.5 mm in diameter, an external appearance thereof may greatly be improved by adding 2–8 parts of ethylene-propylene copolymer into high density polyethylene.
2. While a better external appearance of the electric wire could not be obtained at a speed more than 800 m/min. in the prior art, a better external appearance thereof can be obtained even at a speed of 1500 m/min. according to the present method, and in addition, high speed extrusion characteristic may greatly be improved and uniform foaming in both sectional and lengthwise directions may be achieved.

A fourth embodiment according to the present invention is concerned with an apparatus obtained by further improving the apparatus used in the first method.

This improved apparatus will now be described in reference to FIG. 7.

Figure 7:
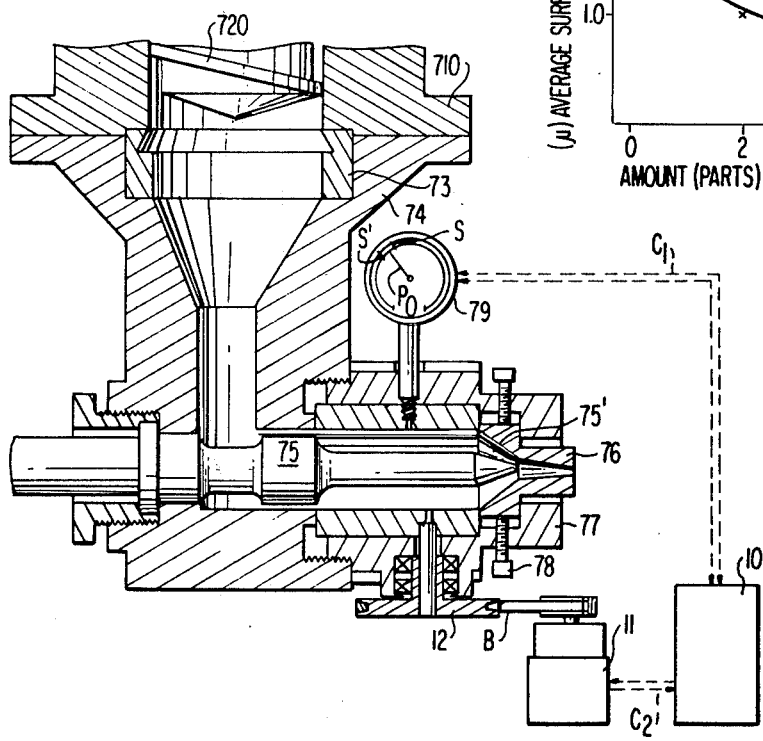
FIG. 7 is a partially cutaway view schematically illustrating a cross head portion in a fourth embodiment according to the present invention.

In FIG. 7, which schematically illustrates a cross head portion, the cross head portion comprises a cylinder 710, a screw 720, a breaker plate 73, an extruder cross head 74, and a nipple holder 75 positioned in a passage which communicates the cross head with the extrusion orifice. A portion of the extrusion orifice is defined by the nipple holder 75 corresponding to the narrow passage which forms a principal portion in the first embodiment, and a wide passage 75' leading to the extrusion orifice being arranged ahead of the nipple holder. The cross head portion further comprises a die 76, a die holder 77, and a die adjusting bolt 78; the inside of the die 76 forming the extrusion orifice together with the nose of the wide passage 75'. A pressure gage 79, which is in communication with the wide passage 75', provides an extrusion pressure setting reference at the time of normal operation of the extruding machine with the aid of a pressure pointer $P_o$ and reference scales S and S'. The reference numeral 10 denotes a pressure control box, 11 a motor, 12 an overflow cock open to the aforesaid wide passage 75', the degree of opening of the cock being adjusted by normal and reverse rotation of the motor 11. The aforesaid elements 79, 10, 11, and 12 are interlocked in a manner as follows: If the pressure measured in the pressure gage 79 is at the reference level, the pointer $P_o$ assumes a neutral position relative to S and S'. However, if the pressure deviates from the set reference, the pointer $P_o$ and the scales S and S' are brought into contact during a period of such deviation, whereby a pressure or electrical control signal is generated by apparatus well known in the art. The control signal is transmitted to the control box 10 through a transmission line $C_1$ between the pressure gage 79 and the pressure control box.

The control box 10 is in the form of a relay having normal and reverse control functions, and in response to the polarity of the received signal, selectively generates a polarity signal further amplified thereby, and the thus generated signal is transmitted through a line $C_2$ to the motor 11. The motor 11, which is either in the form of a hydraulic servo motor or a normally and reversely rotating motor, is driven in a direction selected in response to the signal received to open or close the cock 12 by means of a transmission element B.

Figures 8A, 8B:
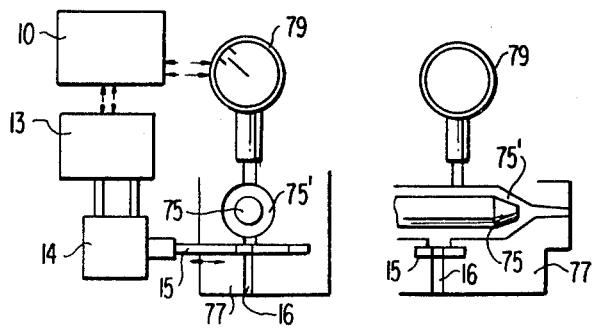
FIGS. 8A and 8B schematically illustrate front and side sectional views of one example of the operation of an overflow cock in the fourth embodiment.

FIG. 8 shows one example in which the over-flow cock is operated by means of a hydraulic unit; elements 75, 75', 77, 79 and 10 being elements similar to those as shown in FIG. 7. An output signal from the control box 10 is sent to a hydraulic control unit 13 to actuate a hydraulic cylinder 14. An overflow opening 16 is opened and closed by a slider type shutter 15 to control a quantity of over-flow.

In the system according to the present invention, any known type of control system or control mechanism may be employed, and such control system or the like can easily be selected to achieve the purpose desired. In short, the internal pressure in the passage communicated with the extrusion orifice is detected by the pressure gage 79 to produce a signal, by which the overflow cock is controlled, whereby the internal pressure in the passage communicated with the extrusion orifice may automatically be controlled so as to meet an extrusion pressure setting reference at the time of normal operation. Thus, according to the fourth embodiment, the internal pressure in the extrusion die required to obtain uniform foaming as desired may automatically be adjusted to the die internal pressure at the time of normal operation without travelling the electric wire in an unstable extrusion condition at the beginning and in the end of extrusion, and also, variation of the die internal pressure until the wire speed reaches a normal operating condition may automatically be adjusted to the die internal pressure at the time of normal operation, and naturally, unstability of conditions may be overcome according to even a sudden change at the time of usual operation, thereby attaining the object as desired.

While the invention has been described in detail and with reference to specific embodiments thereof, it will be apparent to one skilled in the art that various changes and modifications can be made therein without departing from the spirit and scope thereof.

What is claimed is:

1. Apparatus for extrusion coating a resin onto a wire to form an insulated electrical cable, said resin containing a foaming agent and being received by said apparatus in an unfoamed state and extruded in a foamed state, said apparatus comprising:

a cross head, having a die forming an extrusion orifice through which said wire passes and at which said resin is extruded onto said wire, said crosshead further including a first passage (3) for receiving unfoamed resin and passing said resin to said extrusion orifice;

a second passage (2) for passing said unfoamed resin to said cross head;

a breaker plate (1) disposed between said mixing apparatus and said second passage for passing said unfoamed resin from said mixing apparatus to said second passage;

a nipple (6) positioned within said first passage to restrict the flow area cross section within said first passage, said nipple having a large diameter section (61) for defining a small cross sectional flow area (31) within said first passage and a smaller diameter section downstream of said large diameter section for defining a larger cross sectional flow area portion (32) within said first passage, said small cross sectional flow area portion restricting the flow of unfoamed molten resin, said resin experiencing a drop in pressure when travelling from said small cross sectional flow area to said larger cross sectional flow area to thereby separate said foaming agent from said resin and form bubble nuclei within said resin.

2. Apparatus as claimed in claim 1 further comprising means for detecting the pressure in the portion of said first passage having a large cross section, and control means actuated in response to said pressure deviating from a predetermined normal pressure for automatically diverting an overflow quantity of said resin to vary the pressure in said large cross sectional flow area portion of said first passage.

3. An apparatus as defined in claim 1, wherein:

$$1.02 \leq \frac{D}{D_o} \leq 1.08 \qquad \text{(a)}$$

$$5 \leq \frac{2R}{D - D_o} \leq 20 \qquad \text{(b)}$$

where D is the inside diameter, in millimeters, of said first passage, $D_o$ is the outside diameter, in millimeters, of the large diameter section of said nipple and R is the length, in millimeters, of the large diameter section of said nipple.

4. An apparatus as defined in claim 3, wherein $D/D_o$ is substantially equal to 1.04, and $2R/D - D_o$ is substantially equal to 10.

* * * * *